Patented Nov. 10, 1936

2,060,312

UNITED STATES PATENT OFFICE 2,060,312

METHOD FOR THE PRODUCTION OF HYDROGENATION PRODUCTS OF THE FOLLICLE HORMONES

Friedrich Hildebrandt, Hohen Neuendorf, near Berlin, Germany, and Erwin Schwenk, New York, N. Y., assignors to Schering-Kahlbaum A. G., Berlin, Germany No Drawing. Application October 21, 1933, Serial No. 694,688. In Germany October 27, 1932

5 Claims. (Cl. 260—153)

This invention relates to hormones and more particularly to the production of hydrogenation products of the follicle hormones.

It is an object of our invention to provide means whereby hydrogenation products of the follicle hormones are produced which proved to be highly effective in the capon comb test.

The follicle hormone of the formula $C_{18}H_{22}O_2$ can be transformed by gentle methods of reduction whereby only two atoms of hydrogen are taken up into a mixture of crystalline isomeric compounds of the formula $C_{18}H_{24}O_2$. These compounds can be separated from each other by processes of fractionation. Thereby, for instance, a crystalline product of the melting point 168–170° C. and another one of the melting point 198–202° C. are obtained. In accordance with the structural formula of the follicle hormone given by Butenandt (Zeitschrift für angewandte Chemie 1932, Report on his lecture, Versammlung deutscher Naturforscher und Aerzte in Wiesbaden 1932) as the most probable one it must be assumed that the carbonyl group of the hormone is reduced to the secondary alcohol group in the obtained reduction products, while the benzene nucleus of the follicle hormone is unattacked.

Now, it has been found that the mixture of isomers of the formula $C_{18}H_{24}O_2$ as such as well as the chemical individual of the same composition isolated from this mixture can be further hydrogenated catalytically when using catalysts which induce hydrogenation of the benzene nucleus. The hydrogenation product obtained thereby proved to be highly effective on physiologically assaying it in the capon comb test.

In our copending application Ser. No. 694,686, filed Oct. 21, 1933 and entitled Hydrogenation products of follicle hormones and method of producing same we have described resulting products having the following structural formula:

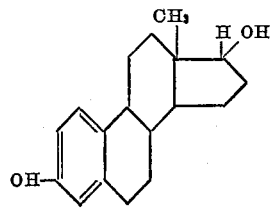

Upon further hydrogenation in accordance with the present invention the double bonds of the benzene nucleus may be broken and hydrogen substituted therefor in accordance with the following general formula:

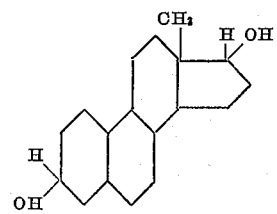

The term "reduction products of the follicle hormones" as used in the specification and in the claims annexed hereto is intended to include not only the reduction products of the follicle hormone of the formula $C_{18}H_{24}O_2$ but also its homologues, such as the reduction products of equilin, hippolin and the like.

Example 1

1 g. of the compound of the formula $C_{18}H_{24}O_2$ which represents the mixture of isomers obtained by reducing the follicle hormone, is dissolved in 10 cc. of alcohol 0.5 g. of a catalyst, prepared in the usual manner by jointly precipitating the sulfates from a mixture of nickel and copper sulfate, are added to the above solution, which is then treated with hydrogen at a temperature of 160° to 170° C. When the reaction has come to an end, water is added to the solution whereby the hydrogenated compound is precipitated. The latter is separated by recrystallization from methanol into a crystalline product and an oily component. Both are effective in the capon comb test. This shows that the product of hydrogenation has acquired the physiological characteristics and effects of the male sex hormone.

Example 2

1 g. of the follicle hormone reduction product of the formula $C_{18}H_{24}O_2$ and the melting point 198–202° C. is dissolved in 150 cc. of glacial acetic acid. The solution is thoroughly shaken in the presence of 500 mg. of a platinum oxide catalyst prepared according to Adams-Shriner, at room temperature in a hydrogen atmosphere until no more hydrogen is consumed. The filtered reaction liquid is evaporated to dryness in vacuo, the residue is dissolved in ether and the ethereal solution is shaken with an aqueous alkali solution in order to remove traces of the not-hydrogenated product. After evaporation of the ether, a light-colored, very consistent resin is obtained the carbon and hydrogen determination of which indicates a product of the formula $C_{18}H_{30}O_2$. This substance shows great efficiency in the capon comb test. It is possible to produce by recrystallization followed by fractionated distillation in a high vacuum, crystalline fractions which are already in amounts of 0.5 mg. physiologically effective in the capon comb test.

Various changes may be made in the details disclosed in the foregoing specification without departing from the invention and from the principles set forth herein and in the claims annexed hereto.

What we claim is:—

1. The method of producing hydrogenation products of the follicle hormones, having the general formula $C_{18}H_{30}O_2$ and containing two secondary alcohol groups in their molecule comprising causing the reduction products of the follicle hormones, having the general formula $C_{18}H_{24}O_2$ and containing one secondary alcohol and one phenol group in their molecule, to react with activated hydrogen under such conditions that the benzene nucleus in the molecule is hydrogenated while no oxygen is split off from said starting material.

2. The method of producing hydrogenation products of the follicle hormones, having the general formula $C_{18}H_{30}O_2$ and containing two secondary alcohol groups in their molecule comprising causing the reduction products of the follicle hormones, having the general formula $C_{18}H_{24}O_2$ and containing one secondary alcohol and one phenol group in their molecule, to react with activated hydrogen under such conditions that the benzene nucleus in the molecule is hydrogenated while no oxygen is split off from said starting material and isolating the hydrogenation products thus produced.

3. Hydrogenation products of the follicle hormones having the general formula $C_{18}H_{30}O_2$ and the following general structural formula:

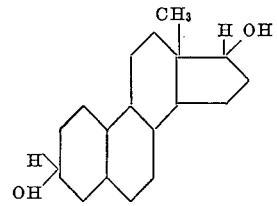

wherein the CHOH groups are most probably in the position shown and showing a pronounced effect in the capon comb test.

4. Hydrogenation products of the follicle hormones having the general formula $C_{18}H_{30}O_2$ and the following general structural formula:

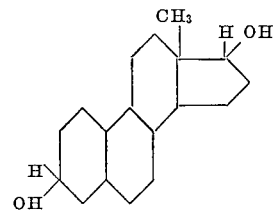

wherein the CHOH groups are most probably in the position shown.

5. A physiologically effective therapeutically active preparation comprising a hydrogenation product of the follicle hormones having the general formula $C_{18}H_{30}O_2$ and the following structural formula:

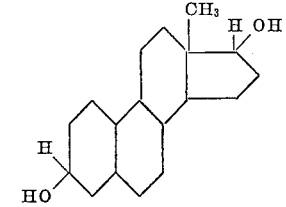

and having physiological characteristics of the male sex hormone.

FRIEDRICH HILDEBRANDT.
ERWIN SCHWENK.